United States Patent [19]

Tsuchida et al.

[11] Patent Number: 5,079,651
[45] Date of Patent: Jan. 7, 1992

[54] DIGITAL AUDIO TAPE RECORDER AND MUSIC PROGRAM JUMP SELECTING METHOD THEREOF

[75] Inventors: Masami Tsuchida; Kiichiro Koguchi; Hisashi Yagi; Toshio Ohtani; Kiyoshi Iwai; Fumihiko Miyamoto; Hiroshi Kawaguchi, all of Saitama, Japan

[73] Assignee: Pioneer Electronic Corporation, Tokyo, Japan

[21] Appl. No.: 344,739

[22] Filed: Apr. 28, 1989

[30] Foreign Application Priority Data

Jul. 21, 1988 [JP] Japan .................. 63-180190
Jul. 22, 1988 [JP] Japan .................. 63-181707

[51] Int. Cl.$^5$ .................. G11B 15/18; G11B 17/00; G11B 19/02
[52] U.S. Cl. .................. 360/72.2
[58] Field of Search .................. 360/72.2, 72.1

[56] References Cited

U.S. PATENT DOCUMENTS 4,821,128 4/1989 Inazawa .................. 360/72.2 X
4,890,171 12/1989 Nagao .................. 360/72.2 X

FOREIGN PATENT DOCUMENTS 203797 12/1986 European Pat. Off. .
3705353 8/1987 Fed. Rep. of Germany .
3621263 1/1988 Fed. Rep. of Germany .
2096381 4/1981 United Kingdom .

OTHER PUBLICATIONS

IBM Technical Disclosure Bulletin, vol. 22, No. 12 (May 1980).

Primary Examiner—A. J. Heinz
Attorney, Agent, or Firm—Sughrue, Mion, Zinn, Macpeak & Seas

[57] ABSTRACT

A digital audio tape recorder and a method for operating the same, especially in a music program jump selecting mode. In one embodiment, the state of an erasure-preventing tab is detected, and TOC (Table-Of-Contents) information is transferred from the tape to a TOC information memory only when the erasure-preventing tab is set to an indicate an unrecordable state. In accordance with another embodiment, when the music program number of the music selection presently being reproduced is known and the program number is aligned, a target music program number is calculated and displayed.

2 Claims, 9 Drawing Sheets

| FRAME NO | PNO | A-TIME | | | |
|---|---|---|---|---|---|
| | | HOUR | MINUTE | SECOND | |
| N | 01 | 0 | 00 | 10 | ($t_1$) |
| N + 1 | 02 | 0 | 10 | 12 | ($t_2$) |
| N + 2 | 03 | 0 | 20 | 58 | ($t_3$) |
| N + 3 | 04 | 0 | 31 | 00 | ($t_4$) |
| N + 4 | 05 | 0 | 42 | 31 | ($t_5$) |
| N + 5 | | | | | |

DIGITAL AUDIO TAPE RECORDER AND MUSIC PROGRAM JUMP SELECTING METHOD THEREOF

BACKGROUND OF THE INVENTION

The present invention relates to a rotary head-type digital audio tape recorder, namely, a so-called R-DAT. In particular, the invention relates to an R-DAT in which the reading of TOC (Table of Contents) information is inhibited by detecting the state of a tab provided for preventing accidental erasure of a cassette played on the R-DAT.

Figure 4:
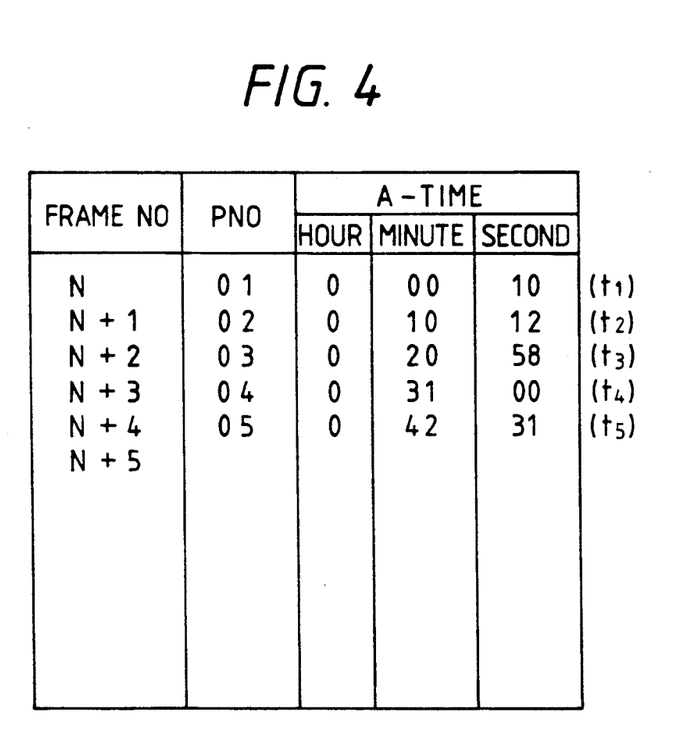
FIG. 4 is a diagram showing an example of TOC information.

As is well known, an R-DAT (abbreviated to DAT hereinafter) is required to perform various functions such as a renumbering function in which program numbers (PNOs) which are not recorded in sequence and which would otherwise result in overlap, missing numbers, etc., are re-recorded in a continuous sequence in an after-recording process, and a so-called TOC renumbering function for collecting TOC information (U-TOC) during the above renumbering operation and writing the TOC information in a subcode region of a top program, that is the program which is recorded first on the tape. FIG. 4 shows a recording format of the TOC information for a TOC renumbering operation.

Figure 1:
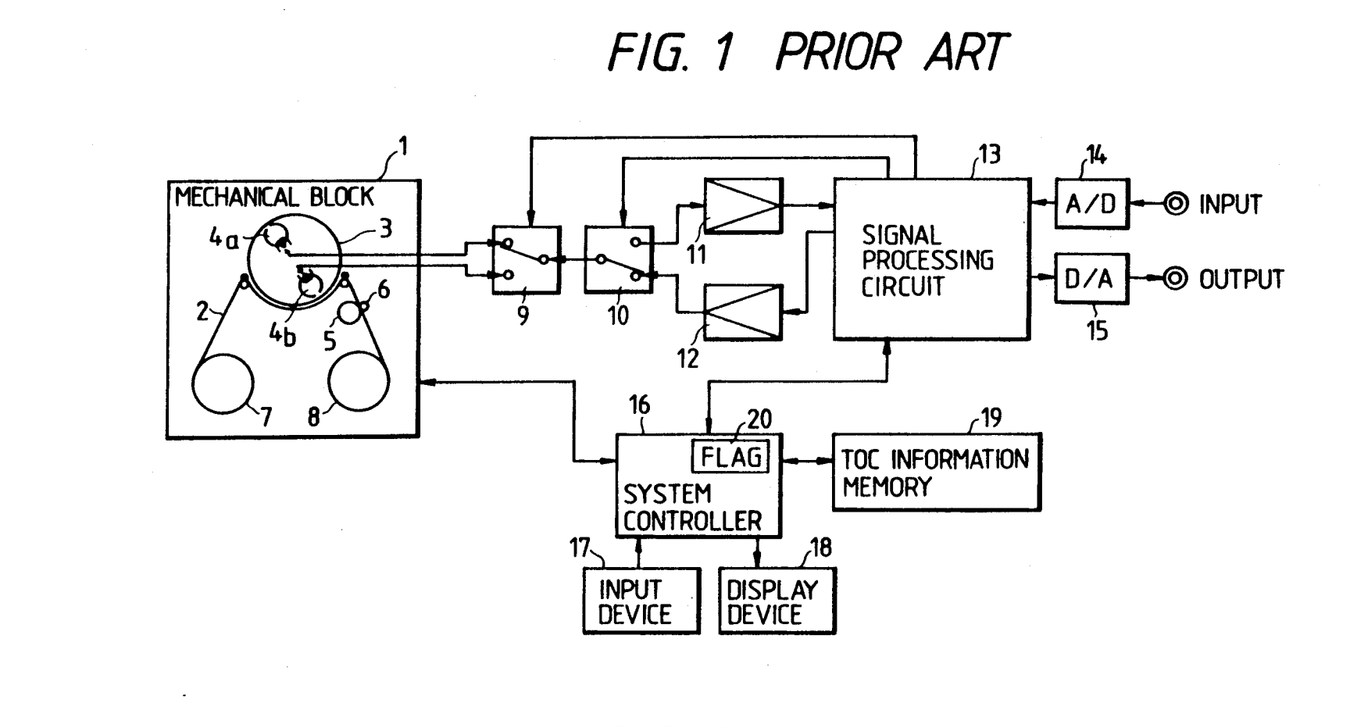
FIG. 1 is a block diagram of a conventional apparatus.
Figure 2:
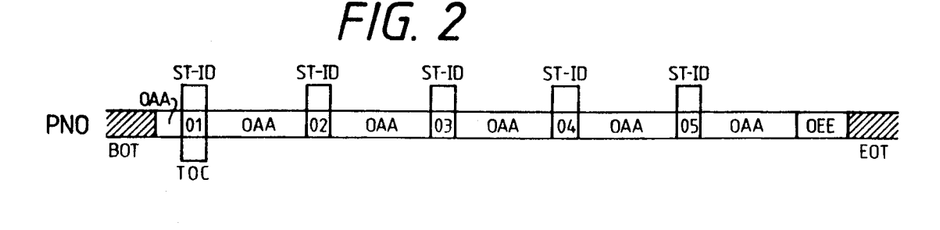
FIG. 2 is a diagram showing a recording format of TOC information on a magnetic tape.

FIG. 1 shows the construction of a conventional DAT. In this figure, reference numeral 1 indicates a mechanical block including a mechanism for effecting the running of the magnetic tape 2, a rotary drum 3 for helical scanning of the tape 2, magnetic heads 4a and 4b for recording/reproduction and which are attached to a rotary drum 3, a pinch roller 5, a capstan 6, a supply reel 7, and a take-up reel 8.

Further, reference numeral 9 indicates a head change-over switch for switching between magnetic heads 4a and 4b as the rotary drum 3 rotates; 10, a recording/reproduction changeover switch for switching between recording and reproduction modes; 11, an amplifier used for reproduction; 12, an amplifier used for recording; 13, a signal processing circuit including various circuits such as an encoder, decoder, etc.; 14, an A/D converter; 15, a D/A converter; 16, a system controller composed of a microcontroller, etc., for controlling the various operations of the overall apparatus; 17, an input device for instructing various operating commands from the exterior to the system controller 16; 18, a display device for displaying the operating state of the apparatus; 19 a TOC information memory for storing the TOC information; and 20, a flag for storing and indicating the detection of a read-out area on the magnetic tape 2 by an end mark operation or an end search operation.

The operation of the conventional DAT constructed as described above will now be described.

In the conventional DAT, the aforementioned TOC renumbering operation is executed in the case where a renumbering operation is executed subsequent to a so-called end mark operation for recording PNO="OEE" (read-out area) indicative of a terminal portion on the tape, or a so-called end search operation for searching for PNO="OEE" (read-out area) indicative of the terminal portion recorded on the tape. Accordingly, the end mark operation and the end search operation will first be described prior to a description of the renumbering processing.

The end mark operation is an operation for recording on the tape PNO="OEE" (read-out area) indicative of the recording terminal portion, which is prescribed by the subcode format for the R-DAT as mentioned above. This operation is normally a processing operation executed after completion of overwriting, etc.

When the end mark operation is instructed from the input device 17, the system controller 16 clears the internal flag 20 (="0") and outputs "OEE" representing the read-out area a the PNO to the signal processing circuit 13. Then, the signal processing circuit 13 and the mechanical block 1 are set for the recording operating mode, and PNO="OEE" representing the read-out area is recorded for 9 seconds in the subcode region of the recording terminal portion of the tape in which overwriting is to be performed (see FIG. 3A).

After PNO="OEE" has been recorded for 9 seconds, the system controller 16 sets the mechanical block 1 to a rewinding mode to rewind the tape to a recording start point of PNO="OEE" and sets the flag 20 to "1", completing the end mark operation.

Figure 3A:
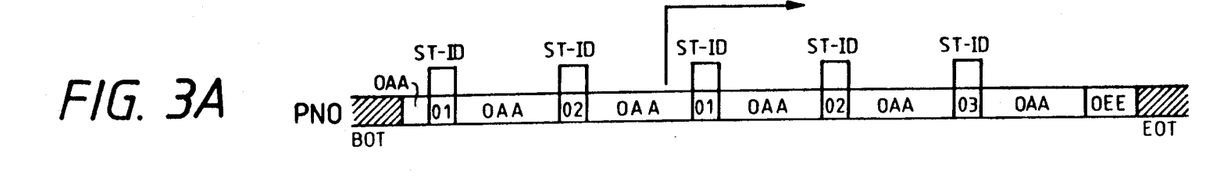
FIGS. 3A-3D, taken together, constitute an explanatory diagram of a renumbering operation.

Thus, PNO="OEE" located in the recording terminal portion of the program and representing the read-out area is recorded on the tape, as illustrated in FIG. 3A, and further, the flag 20 stored within the system controller 16 is set to "1", indicative of the detection of the read-out area.

The end search operation is an operation for searching for PNO="OEE" (read-out area) representing the recording terminal portion of the program recorded on the tape, as described before. This operation is normally a processing operation executed prior to the TOC renumbering operation.

When a command for the end search operation is provided from the input device 17, the system controller 16 clears the internal flag 20 (="0").

Next, it is judged whether the present position of the tape is an unrecorded portion or not. In the case of an unrecorded portion, a rewinding running mode is set, and in the case of a recorded portion, a rapid traverse (cue) mode is set. When PNO="OEE" indicative of the read-out area is detected in the respective running modes, the tape is rewound until the recording starting point where PNO="OEE" is reached, whereupon the flag 20 is set to "1" and the operation of the mechanical block 1 is stopped, completing the end search operation.

Thus, the flag 20 is set to "1", indicative of the detection of the read-out area.

The renumbering operation will now be described with reference to the explanatory diagram of FIGS. 3A-3D.

As shown in FIG. 3A, program numbers (PNO) "01" and "02" are assumed to be recorded on the magnetic tape 2 in an overlapping state. Further, absolute time (A-TIME) data $t_1$ to $t_5$ at the recording starting point of each program are used as collected TOC information, as illustrated in FIG. 3D.

When the system controller 16 receives a renumbering command from the input device 17, it is first checked whether the above-mentioned flag 20 is set to "1". When the flag="0", i.e., when the renumbering command is not instructed subsequent to the above-mentioned end mark operation or end search operation, the processing mode employed is the normal renumbering operation whereby only the PNO is aligned and rewritten in sequential order.

On the other hand, when the flag="1", i.e., when the renumbering command is issued subsequent to the above-mentioned end mark operation or end search operation, the processing mode employed is a so-called TOC renumbering operation in which TOC information is also written at the same time the renumbering operation is performed.

Figures 3B, 3C:
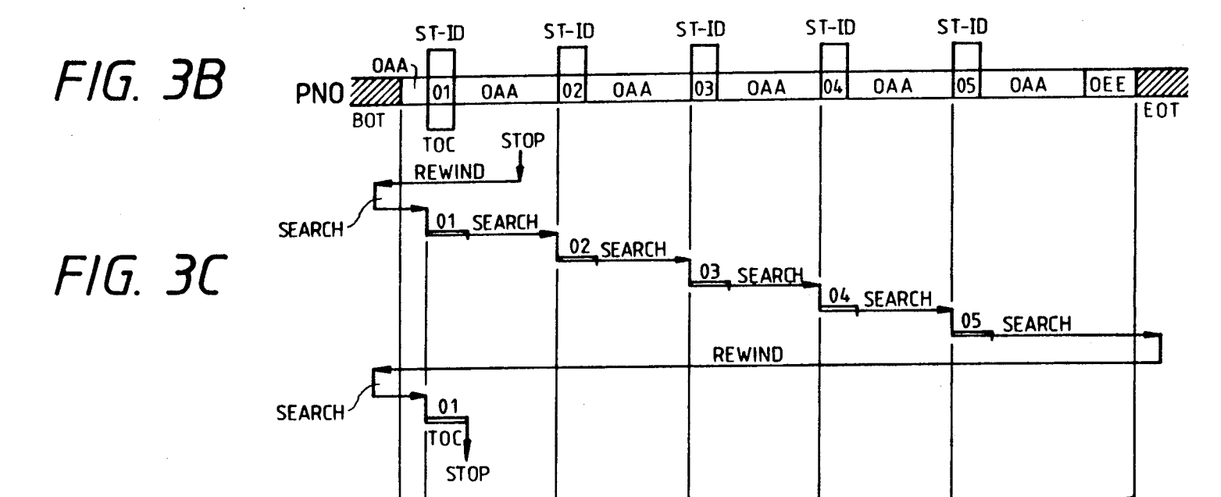
Figure 3D:
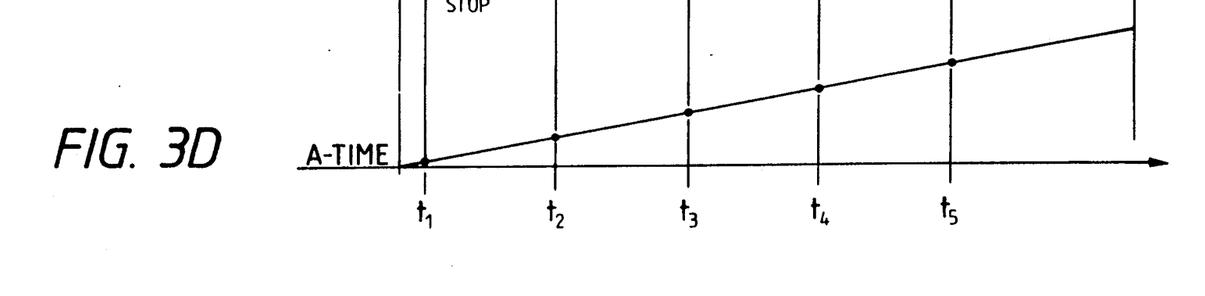

Namely, as in the operation during TOC renumbering as shown in FIG. 3C, the system controller 16 controls the mechanical block 1 so as to rewind the magnetic tape 2 until a beginning end portion thereof (BOT) is reached. At this time, a counted PNO value held by a counter (not shown) within system controller 16 is reset to "00". Subsequently, the system controller 16 controls the mechanical block 1 to set it to a search running mode in which a STart-ID (ST-ID) recorded in a music top position of each program is searched for.

When the system controller 16 detects the ST-ID of the first program, a value of "1" is added to the counter value of the above-mentioned PNO counter, thereby producing a PNO count value of "01". Thereafter, the counted value "01" is outputted as the PNO of the music program to the signal processing circuit 13, and the PNO and ST-ID are rewritten for the prescribed 9 seconds while the signal processing circuit 13 is operated in an after-recording operating mode. Simultaneously, the system controller 16 stores as TOC information in the memory 19 A-TIME data $t_1$ (see FIG. 3D) at the recording start point of the program as determined by counting the number of rotations of the rotary drum (the number of frames).

After the above-mentioned PNO and ST-ID have been rewritten for the prescribed 9 seconds, the system controller 16 transmits "OAA", indicative of an invalid PNO, to the signal processing circuit 13 in order to prevent the PNO of the previous program from being incompletely erased, and the value "OAA" indicative of the invalid PNO is subsequently written to the signal processing circuit for 2 seconds, thereafter stopping the after-recording operation. The above-mentioned renumbering operation and the collection of the TOC information are repeatedly executed with respect to each program from the beginning end to the terminal end (EOT) of the tape, as shown in FIG. 3C.

By the above operations, all of the PNOs from the tape beginning end to the tape terminal end are rewritten as continuous numbers according to the sequentially recorded order of the program, as indicated by "01" to "05" in FIG. 3B. Simultaneously, A-TIME data $t_1$ and $t_5$ at the recording starting point of each program are collected as TOC information and stored in the TOC information memory 19, exemplary specific values being shown in FIG. 4.

When the renumbering operation for all the PNOs and the collection of the TOC information have been completed from the beginning end to the terminal end of the tape, the processing mode is changed to the recording operation for the TOC information.

The system controller 16 rewinds the tape until the beginning end (BOT) is reached, then searches for the first program recorded on the tape, i.e., the program having PNO="01".

When the search for the above first program has been completed, the system controller 16 outputs "01" as the PNO and starts the after-recording of the PNO for 9 seconds again. Simultaneously, A-TIME data $t_1$ to $t_5$ for each program stored in the TOC information memory 19 are written as TOC information to the subcode region for the program of PNO="01" for 9 seconds, completing the TOC renumbering operation.

When the above TOC renumbering operation has been completed, as shown in FIG. 3B, the PNOs of all programs recorded on the magnetic tape 2 are rewritten as a continuous sequence of numbers according to the sequentially recorded order of the programs such as "01" to "05" from the beginning end to the terminal end of the tape, and A-TIME data $t_1$ to $t_5$ at the recording start point of each program are recorded as TOC information in the subcode region of the first program (PNO="01") on the tape.

In general, when a cassette is placed in a DAT to reproduce or record a program, the TOC information written in the subcode region of the first program recorded on the tape is automatically read, and thereafter a search, etc., is performed at a high speed based on the read TOC information.

However, in a conventional DAT, when a new cassette is loaded, the TOC information is automatically read irrespective of the state of a tab provided for preventing the unintentional erasure of the cassette. Further, the TOC information is automatically read for use in searching, etc., even in the case of a so-called overwritable cassette in which the erasure-preventing tab is set to the recordable state. Therefore, when the subcode information is added and erased after the TOC information has been read from a cassette in which the erasure-preventing tab is set to the recordable position, the TOC information read when the cassette is first loaded is not coincident with the subcode information actually recorded on the tape, thereby causing problems in the subsequent search operation, etc.

The present invention further relates to a jump method for selecting designated music programs recorded on a tape for a magnetic tape recording and reproducing apparatus, particularly a DAT, in which the operator can easily be informed of the music selecting operation in accordance with information recorded on the tape when a jump selecting operation is performed.

Figure 5:
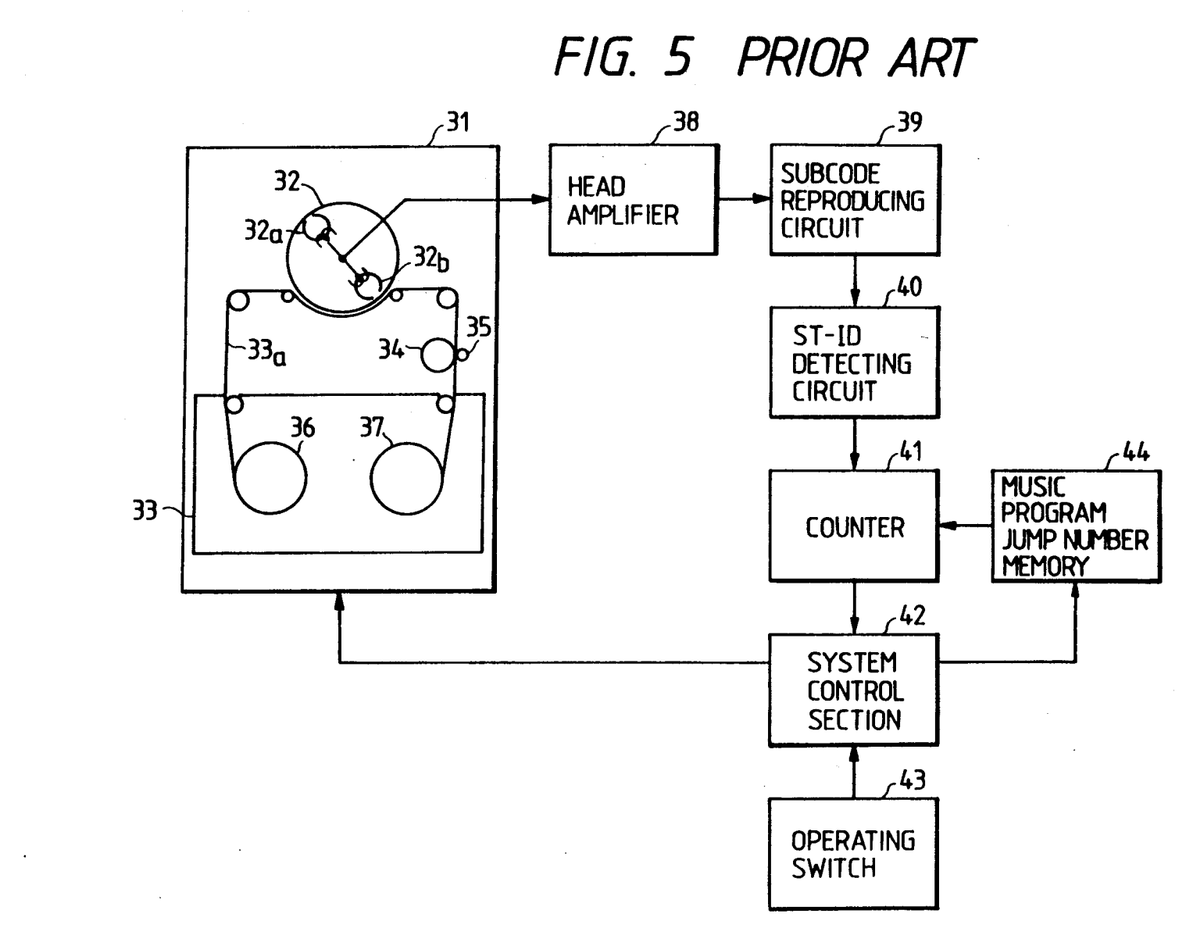
FIG. 5 is a block diagram showing another conventional apparatus.

Another example of a conventional type is shown in FIG. 5.

In this figure, reference numeral 31 indicates a mechanical block, and reference numeral 32 a rotary drum carrying magnetic heads 32a and 32b. Reference numeral 33 indicates a tape cassette containing a magnetic tape 33a; 34, a pinch roller; 35, a capstan shaft; 36, a supply reel; and 37, a winding reel.

Further, reference numeral 38 depicts a head amplifier for amplifying a signal reproduced by the magnetic heads 32a and 32b; 39, a subcode reproducing circuit for reading subcode data from the reproduced signal from the head amplifier 38; 40, an ST-ID detecting circuit for detecting an ST-ID (Start ID), i.e., a code representing a starting portion of a music program and music partition portion, from the subcode data from the subcode reproducing circuit and thereby transmitting an output indicative thereof; 41, a counter for counting the number of ST-IDs from the ST-ID detecting circuit; 42, a system control section for controlling various operations as described later; 43, an operating switch for inputting a music program jump number; and 44, a memory for storing the music program jump number for the system control section 42.

Figure 6:
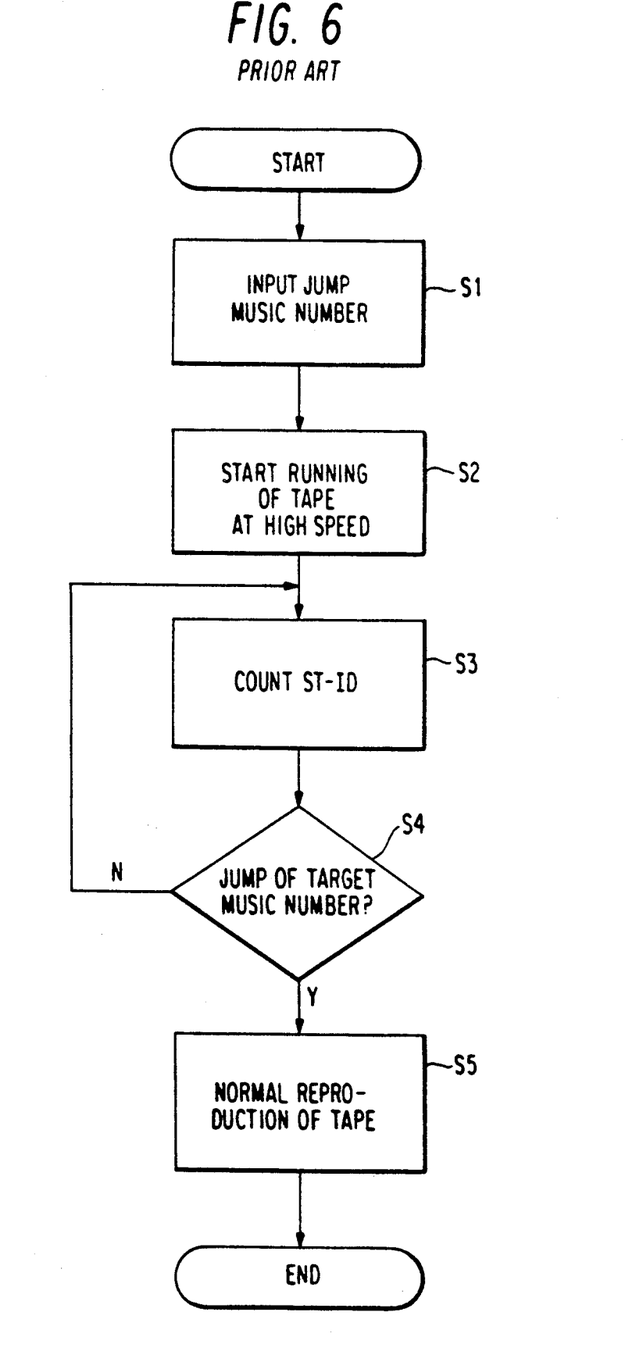
FIG. 6 is a flowchart showing the operation of the conventional apparatus of FIG. 5.

The operation of the above-described apparatus will now be described with reference to the flowchart shown in FIG. 6. First, when a music program jump number is inputted to the system control section 42 by the operating switch 43 (step S1), the system control section 42 operates the mechanical block 31 at a high speed (step S2). In the high speed operation, magnetic heads 32a and 32b read subcode data, which is reproduced by the subcode reproducing circuit 39 through the head amplifier 38. The music program jump number inputted by the operating switch 43 is stored in the memory 44 through the system control section 42.

When the ST-ID is present in the subcode data reproduced by the subcode reproducing circuit 39, the ST-ID detecting circuit 40 detects the ST-ID, and its detection output is counted by the counter 41 (step S3). Then, the system control section 42 judges whether or not the count value of the counter 41 is coincident with the music program jump number stored in the memory 44 (step S4). When the count value is not coincident with the music program jump number, the operation returns to step S3 and, when the counter value is coincident with the music program jump number, the mechanical block 41, which has been operating at high speed, returns to a normal reproducing state, the reproduction of the selected music (step S5) is started, and all required operations are completed.

With respect to the display effect for the jump operation in the conventional apparatus described above, even when several music programs are to be jumped, only the numbers of the programs to be jumped are displayed, and there is no display as to what music program number is being searched, which is confusing to the operator.

Further, it is possible that the detection of the desired ST-ID is missed in the jump selecting program and that detection is performed in error due to noise, etc., and a music program different from the selected music program is reproduced.

SUMMARY OF THE INVENTION

To solve the problems mentioned above, an object of the present invention is to provide a DAT in which, even when TOC information is recorded on a cassette loaded into the DAT, it is regarded that there is a possibility that the TOC information read from the tape is not reliable and the TOC information is not read when the erasure-preventing tab of the cassette is set to the recordable state.

To attain the above object, in accordance with the present invention, a digital audio tape recorder of a rotary head type comprises means for detecting the open and closed states of an erasure-preventing tab on a cassette, TOC information memory means for storing TOC information read from a magnetic tape, and TOC information memory control means for controlling the transfer of the TOC information to the TOC information memory means based on the detected result of the detecting means, whereby the TOC information is transferred into the TOC information memory means when the erasure-preventing tab of the cassette is set to the unrecordable state, and the TOC information is not transferred when the erasure-preventing tab is set to the recordable state.

To further solve the above problems, an object of the present invention is to provide a music program jump selecting method for a magnetic tape reproducing apparatus in which a searched music program number is displayed on a display device such that the operator can clearly comprehend what is happening and the detection of the ST-ID is not missed and the desired music program is reproduced without malfunction due to noise, etc.

To attain the above object, in accordance with another aspect of the present invention, when a program number (number of an information partition portion) recorded in a subcode is aligned and stored, a music program is performed in accordance with the program number at the time of the music program jump selection.

DESCRIPTION OF THE PREFERRED EMBODIMENTS

Preferred embodiments of the present invention will now be described with reference to the accompanying drawings.

Figure 7:
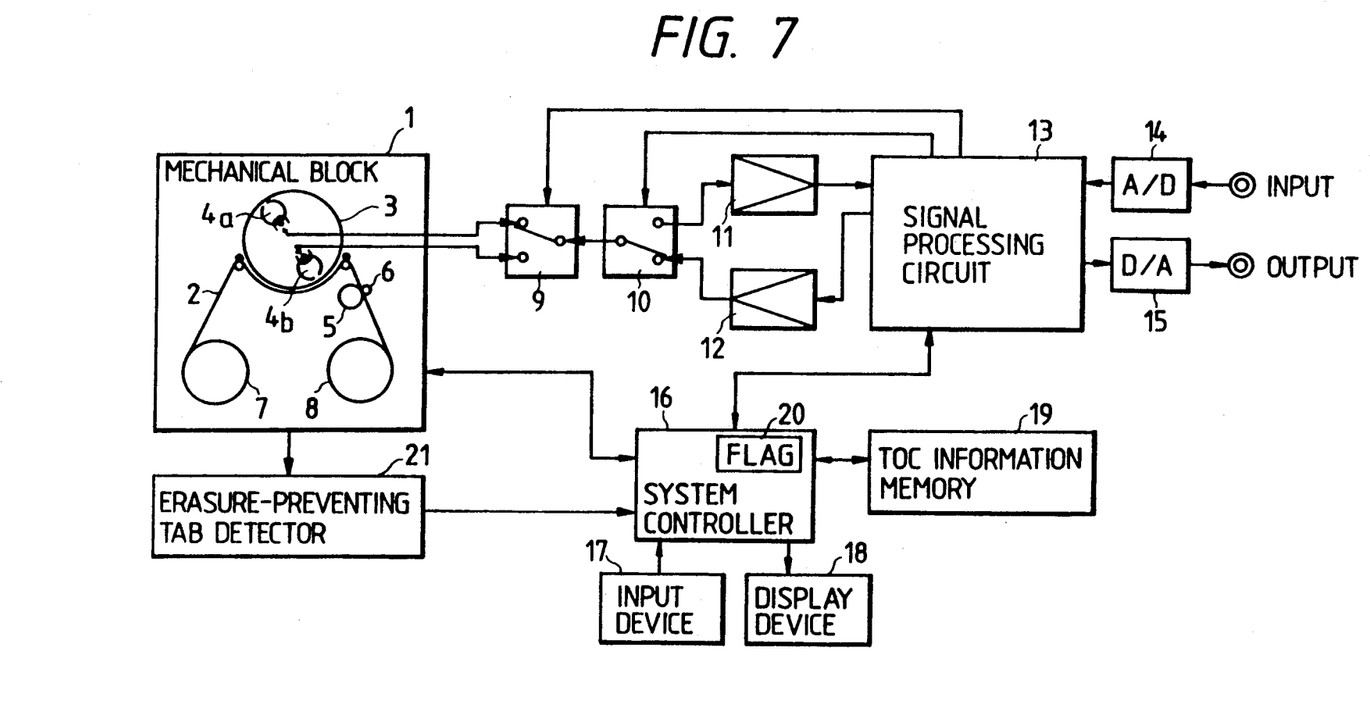
FIG. 7 is a block diagram of an R-DAT apparatus constructed according to a preferred embodiment of the present invention.

FIG. 7 is a block diagram of a preferred embodiment of a DAT constructed in accordance with the present invention. The same constitutional elements as those in FIG. 1 are indicated by the same reference numerals, and therefore a further detailed explanation thereof is omitted.

In this embodiment, the tape recorder has the same general construction as that of a conventional DAT, but further includes an erasure-preventing tab detector 21 for detecting the open and closed states of a tab for preventing inadvertent erasure of the cassette. In this embodiment of the present invention, it is necessary to provide a TOC information memory controller for controlling the transfer of TOC information to the TOC information memory 19 in addition to the erasure-preventing tab detector 21. However, the latter functional means is realized in this embodiment in software by microcontrollers constituting the system controller 16.

Figure 8:
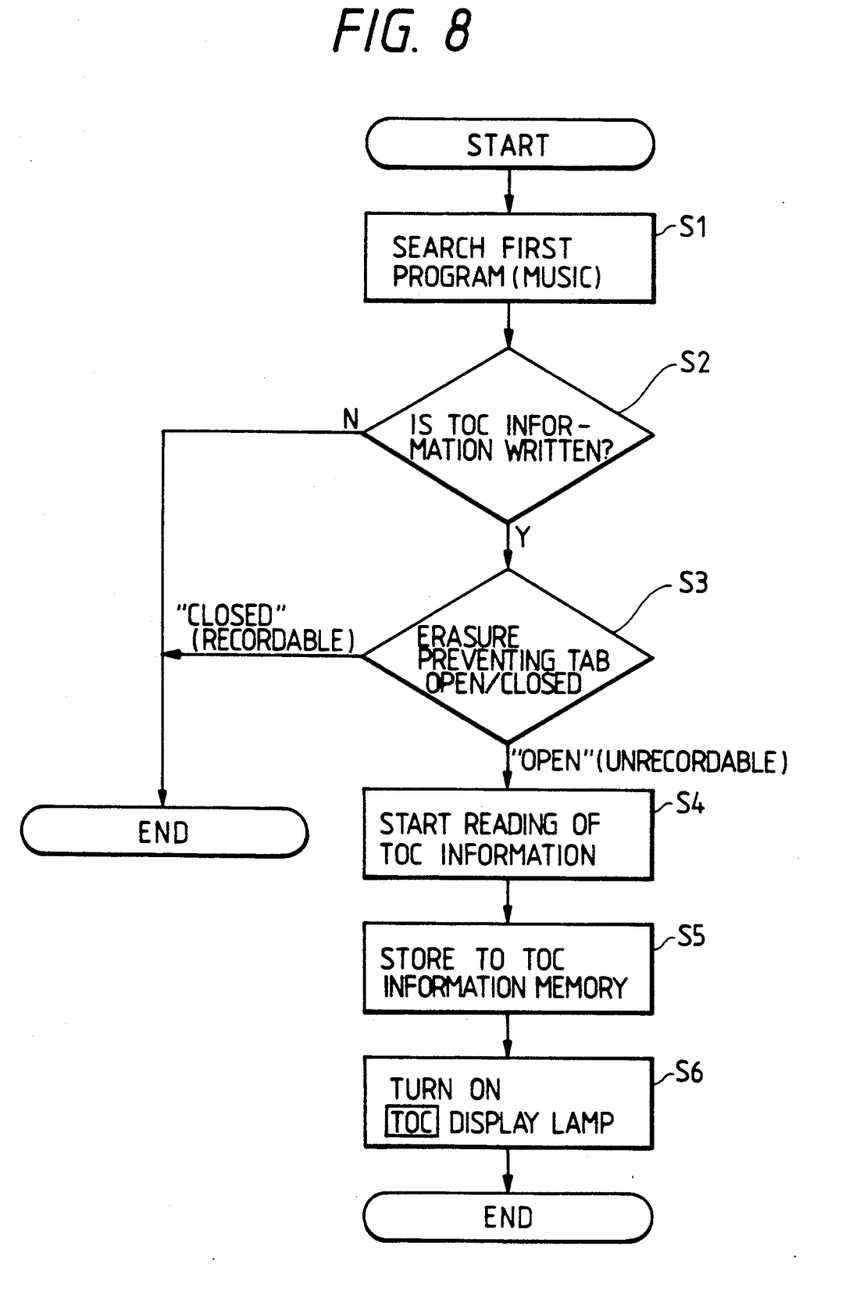
FIG. 8 is a flowchart showing the operation of the apparatus of FIG. 7.

The operation of the apparatus of the above-described embodiment will next be described with reference to the flowchart of FIG. 8.

When the cassette is loaded in the DAT and a read start command for the TOC information is provided from the input device 17, the system controller 16 controls the mechanical block 1 so as to set it to the search running mode, thereby starting the search for a program (the program for which PNO="01") first recorded on the cassette (step S1). The completion of the search operation is judged by the presence of subcode information such as ST-ID (STart ID) recorded on the magnetic tape 2 decoded by the signal processing circuit 13. When the program recorded first on the magnetic tape, i.e., the program (musical selection or the like) having PNO="01" has been searched for and reached, it is judged whether or not TOC information is written in the subcode region of the first program (step S2). If no TOC information is found in that region, the normal reproducing mode is set and the reading operation for the TOC information is interrupted.

On the other hand, when TOC information is present, the system controller 16 tests the output of the erasure-preventing tab detector 21 (step S3). When the erasure-preventing tab detector 21 detects that the erasure-preventing tab of the cassette is "closed", i.e., set to the recordable state, the reading operation of the TOC information is interrupted, similar to the case where no TOC information is recorded.

When it is detected that the erasure-preventing tab of the cassette is "open", i.e., set to the unrecordable state, reading of the TOC information recorded in the subcode region of the first program on the magnetic tape is started (step S4), and the TOC information decoded by the signal processing circuit 13 is stored in the TOC information memory 19 (step S5). After the TOC information has been read and stored, a TOC display lamp of the display device 18 is lit to indicate that the TOC information has been read (step S6), completing the reading operation of the TOC information.

As described above, according to the present invention, it is judged whether the TOC information is to be read or not by detecting the open and closed states of the erasure-preventing tab of the cassette loaded into the DAT. The TOC information is read into the DAT only in the case of a tape in which there is no possibility of the subcode information being added/erased after the TOC information has been read, i.e., a tape used for only reproduction. Accordingly, when the TOC information is read, the TOC information and actual subcode information on the tape are coincident with each other at all times. Therefore, the reliability of the search operation, etc., using the TOC information in the DAT is improved, thus avoiding various problems caused by the noncoincidence of the TOC information and the subcode information recorded on the tape.

Figure 9:
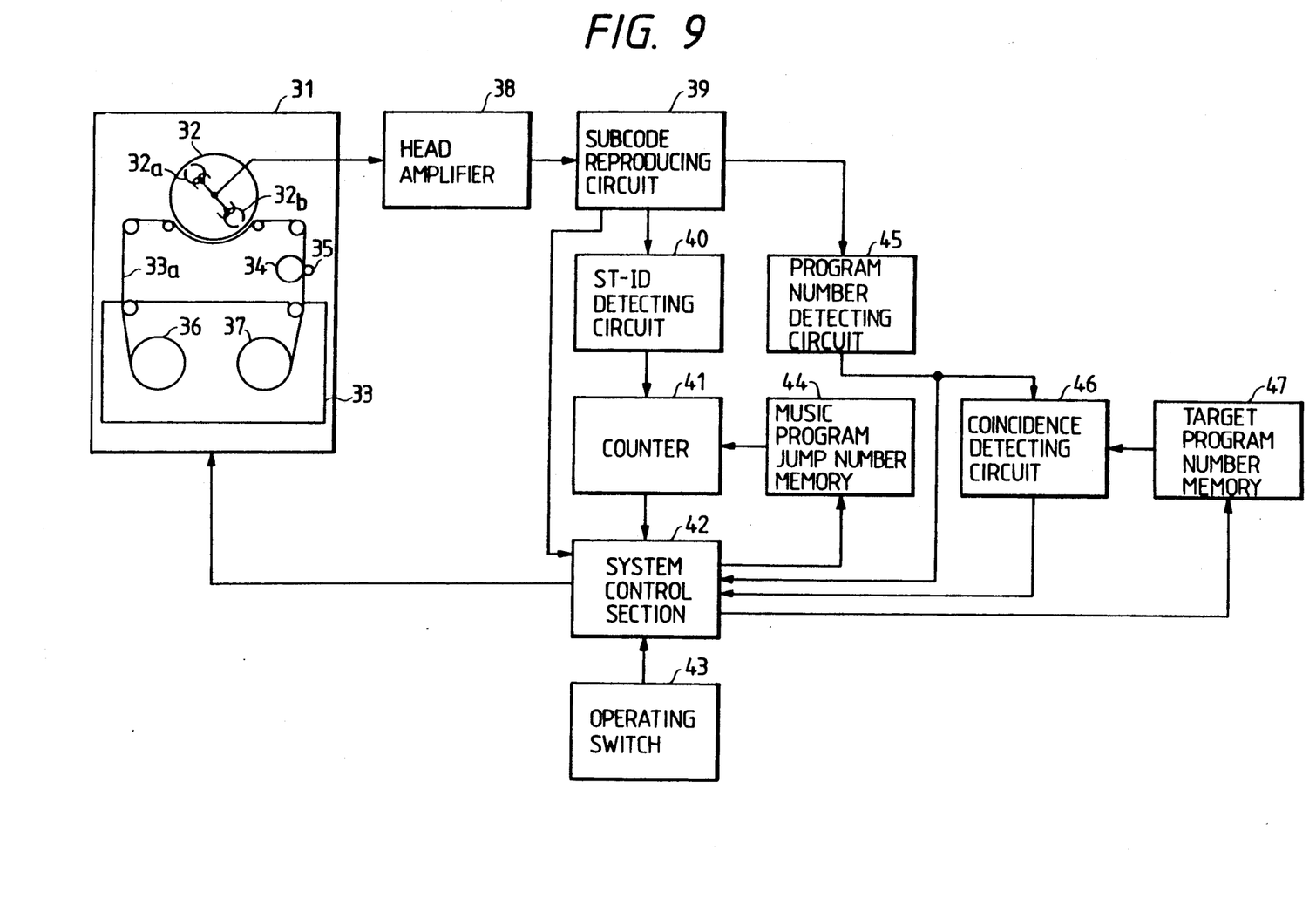
FIG. 9 is a block diagram showing an R-DAT embodying a method of the present invention.

Another embodiment of a magnetic tape reproducing apparatus embodying a program selecting method of the present invention will now be described with reference to FIG. 9. The same reference numerals as those in FIG. 5 indicate like elements, and therefore a further detailed description of those elements is omitted in the following explanation.

The apparatus of this embodiment of the present invention differs from the conventional apparatus by the addition of a program number detecting circuit 45 for detecting a program number in the subcode reproducing circuit 39, the output of which is transmitted to a target program number memory 47 to thus store a result indicating the music program number selected by an operating switch 43 located in the system control section 42. Also, there is added a coincidence detecting circuit 46 which produces an output when the music number outputted from the program number detecting circuit 45 is coincident with the music program number stored in the target program number memory 47. Further, the apparatus of this embodiment of the present invention differs from the conventional apparatus in that subcode data from the subcode reproducing circuit 39 is inputted to the system control section 42.

Figure 10:
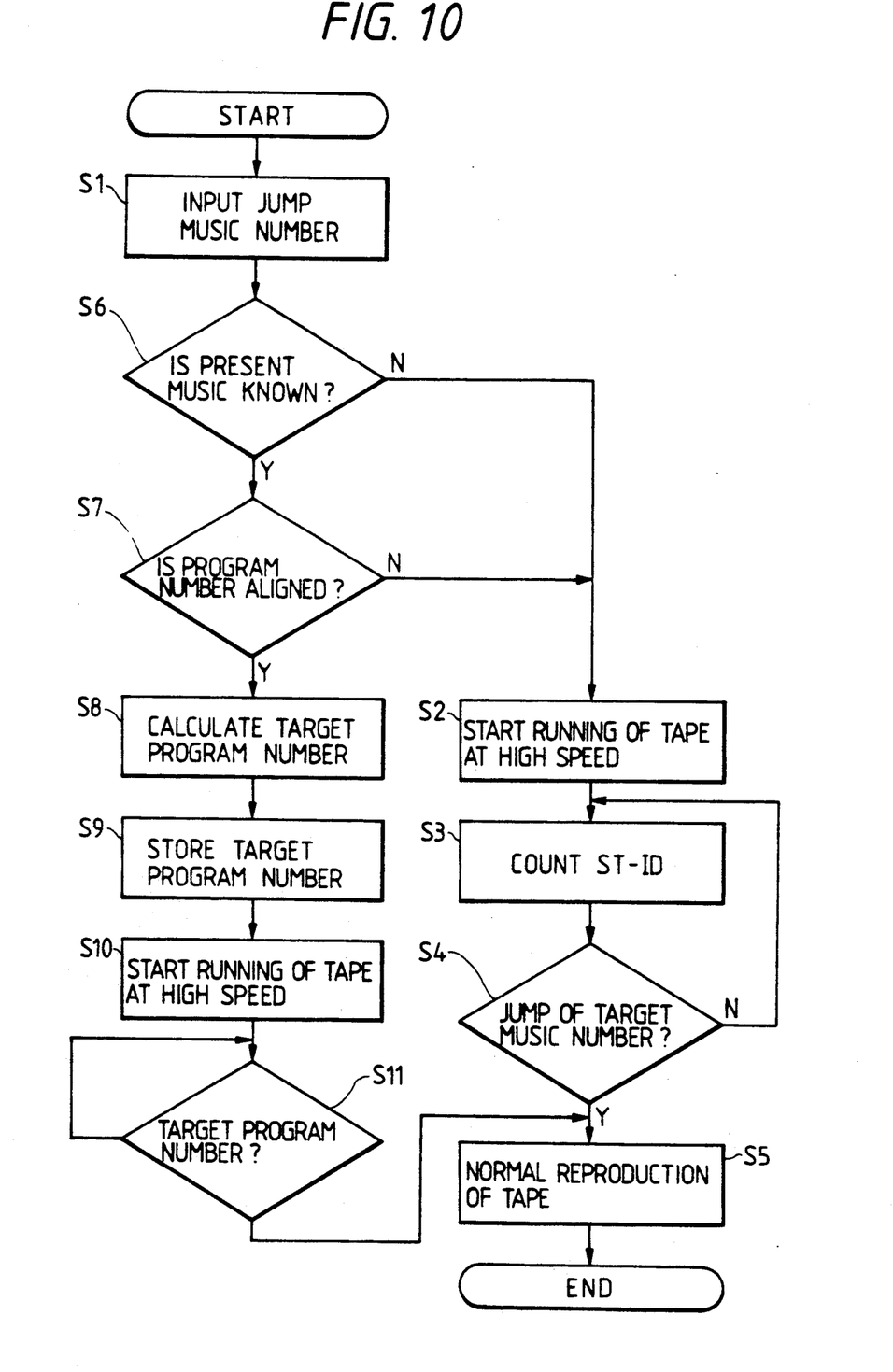
FIG. 10 is a flowchart showing the operation of the apparatus of FIG. 9.

The operation of the above-described apparatus will now be discussed with reference to the flowchart of FIG. 10.

First, when jump music selection is performed by operating the switch 43 and a music program jump number is inputted (step S1), the system control section 42 judges whether the music number reproduced at the present time is known or not (step S6). Subsequently, the system control section 42 judges whether the music program number is aligned or not (step S7). When it is judged that the music program number is unknown in the judgment in step S6 and it is judged that the music program number is not aligned in step S7, the operations in steps S2 to S5 of the flowchart of FIG. 6 in the conventional apparatus mentioned above are similarly performed. When it is confirmed that the music program number at the present time is known in step S6 and the program number is aligned in step S7, the system control section 42 calculates a target program number $N+M$ from a music program jump number N inputted by the operating the switch 43 and a music program number M of a music program being reproduced at the present time (step S8). The target program number is then stored in the target program number memory 47 (step S9).

Thereafter, the system control section 42 operates the mechanical block 31 at a high speed (step S10), and the program number in the subcode read by the magnetic heads 32a and 32b in this high-speed state is detected and inputted to the coincidence detecting circuit 46 through the subcode reproducing circuit 39 and the program number detecting circuit 45. The coincidence detecting circuit 46, in response to the program numbers received from the program number detecting circuit 45, continuously monitors whether the program number from the program number detecting circuit is coincident with the content of the target program number memory 47 until they are in fact coincident with each other (step S11).

When the coincidence detecting circuit 46 detects coincidence, the coincidence detecting circuit transmits a coincidence signal to the system control section 42, whereupon the system control section 42 returns the mechanical block 31 to the normal reproducing state and starts the reproduction of the selected music program (step S5), completing the operation.

In the above-mentioned embodiment, for judging whether the program number is aligned or not, the system control section 42 may judge that the program number is aligned from the TOC information (in which the total number of music selections in the program, starting position of the program, etc., are recorded on the tape) when TOC information is recorded, or by making the tape pass once during normal reproduction, rapid traverse, rewinding the tape, etc.) and by reading and storing the program number of the subcode data.

When the calculated result of the program number at the present time and the jump music selecting number inputted by operating the switch 43 is an impossible or unassigned music number, the input from operating the switch 43 can be ignored, or it is possible to display instructions for performing the input operation with the switch 43 once more.

Further, the selected number of music programs to be jumped may be a plural or single number in either the forward and reverse direction with respect to the present music program number.

As described above, according to the present invention, when the music program number for the music program being reproduced at the present time is known and the program number is aligned, the target music program number is selected instead of the number of music programs to be jumped, making it possible to display what music program is selected as a target in the selecting operation, thereby improving the operator's comprehension of the search process. Further, even when the detection of the ST-ID is missed or performed in error due to noise during the selecting operation, in no case will a music program different from the desired selection will be reproduced. Furthermore, since the selection process is performed according to the program number, even if the detection of the program number is missed for some reason, it is judged that the program number has already passed by reading the next program number, thereby reliably allowing the reproduction of the target selection by rewinding the tape, etc. Further, when the input of the jump music selection is an abnormal input, such an input will cause no error.

What is claimed is:

1. A music program jump selecting method for a digital audio tape recorder, comprising the steps of:

inputting a music program jump number;

judging whether a music program number of a music selection presently being reproduced on a magnetic tape is known;

judging whether said program number is aligned or not;

if the music number of the music selection presently being reproduced is known and said program number is aligned, calculating a target program number from said music program jump number and said program number of said music selection presently being reproduced;

storing the calculated target program number in a target program number memory;

driving said tape at a high speed while reading program numbers in subcode regions recorded on said tape;

monitoring whether each program number read from said tape is coincident with said calculated target program number stored in said target program number memory; and when the program number read from said tape is coincident with said calculated target program number, starting normal reproduction of said tape.

2. The music program jump selecting method of claim 1, further comprising the step of displaying a value corresponding to said calculated target program number stored in said target program number memory.

* * * * *